US009776721B2

(12) United States Patent
Alford

(10) Patent No.: US 9,776,721 B2
(45) Date of Patent: Oct. 3, 2017

(54) RETENTION OF OBJECTS RELATIVE TO AN AIRPLANE CABIN WINDOW FRAME

(71) Applicant: Donald Wilson Alford, McKinney, TX (US)

(72) Inventor: Donald Wilson Alford, McKinney, TX (US)

(73) Assignee: Donald Wilson Alford, McKinney, TX (US)

( * ) Notice: Subject to any disclaimer, the term of this patent is extended or adjusted under 35 U.S.C. 154(b) by 0 days.

(21) Appl. No.: 14/804,443

(22) Filed: Jul. 21, 2015

(65) Prior Publication Data

US 2015/0321760 A1 Nov. 12, 2015

Related U.S. Application Data

(63) Continuation-in-part of application No. 14/739,288, filed on Jun. 15, 2015, now abandoned, which is a
(Continued)

(51) Int. Cl.
*B64D 11/00* (2006.01)
*B64C 1/14* (2006.01)

(52) U.S. Cl.
CPC ............ *B64D 11/00* (2013.01); *B64C 1/1484* (2013.01); *Y10T 29/49828* (2015.01)

(58) Field of Classification Search
CPC ........ B60N 3/103; B60N 3/108; B60N 3/107; B60N 2/4666; B64C 1/1484;
(Continued)

(56) References Cited

U.S. PATENT DOCUMENTS 2,832,498 A 4/1958 Parsons
3,151,649 A 10/1964 Mitchell, Jr.
(Continued)

FOREIGN PATENT DOCUMENTS

GB 2223935 A 4/1990
GB 2491420 A 12/2012

OTHER PUBLICATIONS

Office Action dated Sep. 3, 2014 for U.S. Appl. No. 13/229,712, 39 Pages.
(Continued)

*Primary Examiner* — Nathan J Newhouse
*Assistant Examiner* — Matthew Theis
(74) *Attorney, Agent, or Firm* — Beem Patent Law Firm

(57) ABSTRACT

A holder apparatus for holding an object relative to an airplane cabin window frame can include a structure that locates in opposing window shade channels of the frame, and at least one tray pivotably mounted relative to the structure. A system for holding an object relative to an airplane cabin window can include a holder apparatus with a structure that engages a window frame of the window, and at least one tray pivotably mounted relative to the structure. The structure can engage opposing window shade channels of the window frame in response to rotational displacement of the structure relative to the frame. A method for installing an apparatus in a window can include placing the apparatus between channels of the window, rotating and engaging ends of the apparatus with the window frame channels and displacing it to the bottom of the frame.

23 Claims, 8 Drawing Sheets

Related U.S. Application Data continuation of application No. 13/229,712, filed on Sep. 10, 2011, now Pat. No. 9,064,434.

(58) Field of Classification Search
CPC ...... G09F 23/0091; G09F 23/06; G09F 3/203; B60R 2011/0061; B60R 7/046; B60R 2011/0021; B60R 2011/0071; B60R 2011/0059; B60R 2011/00; B60R 2011/0075; B60R 2011/0026; B64D 11/00; B64D 2011/0679; Y10T 29/49828
USPC ....... 224/482, 571, 556, 555, 564, 277, 278, 224/926, 928, 281, 560, 561, 0.5, 545, 224/547, 539, 544, 566; 454/216; 296/153, 37.13; 297/411.22; 29/428; 248/222.51, 222.52, 297.21, 268, 264, 248/48.2, 447.1, 208; 220/481; 211/94.01, 94.02, 96, 75; 160/84.06
See application file for complete search history.

(56) References Cited

U.S. PATENT DOCUMENTS

| | | | |
|---|---|---|---|
| 3,842,889 A * | 10/1974 | Jones | E06B 9/582 |
| | | | 160/133 |
| 4,749,112 A | 6/1988 | Harper | |
| 4,810,026 A | 3/1989 | Doane | |
| 4,828,211 A | 5/1989 | McConnell et al. | |
| 4,844,400 A | 7/1989 | Jasmagy, Jr. | |
| 4,846,354 A * | 7/1989 | Adams | A47F 5/0846 |
| | | | 211/103 |
| 4,903,872 A | 2/1990 | Henricksen et al. | |
| 4,946,057 A * | 8/1990 | Connolly | B65D 43/12 |
| | | | 206/45.28 |
| 4,984,722 A | 1/1991 | Moore | |
| 5,014,956 A | 5/1991 | Kayali | |
| 5,072,909 A | 12/1991 | Huang | |
| 5,167,392 A | 12/1992 | Henricksen | |
| 5,174,534 A | 12/1992 | Mitchell | |
| 5,279,452 A | 1/1994 | Huynh | |
| 5,280,870 A | 1/1994 | Chick et al. | |
| 5,285,938 A | 2/1994 | Fauchald | |
| 5,318,266 A | 6/1994 | Liu | |
| 5,328,143 A | 7/1994 | Koorey et al. | |
| 5,342,009 A | 8/1994 | Lehner | |
| D353,082 S | 12/1994 | Keven | |
| 5,489,055 A | 2/1996 | Levy | |
| 5,490,622 A | 2/1996 | Tardif | |
| 5,785,222 A | 7/1998 | Basso et al. | |
| 6,047,937 A | 4/2000 | Huang | |
| 6,095,471 A * | 8/2000 | Huang | B60N 3/102 |
| | | | 224/400 |
| 6,227,509 B1 | 5/2001 | Plocher et al. | |
| 6,427,960 B1 | 8/2002 | Gehring et al. | |
| 6,484,989 B1 | 11/2002 | Connery | |
| 6,520,575 B1 | 2/2003 | Yuzawa | |
| 6,527,240 B1 | 3/2003 | Huang | |
| 6,606,996 B1 | 8/2003 | Thornell et al. | |
| 6,619,607 B2 | 9/2003 | Yamada | |
| 6,655,563 B2 | 12/2003 | Shimajiri | |
| 6,705,579 B2 | 3/2004 | Yamada | |
| 7,300,031 B2 * | 11/2007 | Bertsch | A47G 23/0225 |
| | | | 224/281 |
| 8,474,772 B2 | 7/2013 | Miklas | |
| 8,479,960 B2 | 7/2013 | Lopez-Apodaca | |
| 2003/0168486 A1 | 9/2003 | Adams | |
| 2005/0199770 A1 | 9/2005 | Andrews | |
| 2005/0274762 A1 | 12/2005 | Belokin et al. | |
| 2008/0190568 A1 | 8/2008 | Schwarz et al. | |
| 2009/0140023 A1 | 6/2009 | Noble | |
| 2010/0102183 A1 | 4/2010 | Arkin | |
| 2012/0280014 A1 | 11/2012 | Lopez-Apodaca | |
| 2013/0298470 A1 | 11/2013 | Shkut | |

OTHER PUBLICATIONS

Office Action dated Feb. 25, 2016 for U.S. Appl. No. 14/739,228, 26 pages.
Notice of Allowance in related U.S. Appl. No. 13/229,712 dated Feb. 26, 2015, 8 pages.
Final Office Action in related U.S. Appl. No. 14/739,228 dated Jun. 17, 2016, 14 pages.

\* cited by examiner

RETENTION OF OBJECTS RELATIVE TO AN AIRPLANE CABIN WINDOW FRAME

CROSS-REFERENCE TO RELATED APPLICATIONS

This application is a continuation-in-part of prior application Ser. No. 14/739,228 filed 15 Jun. 2015, which is a continuation of prior application Ser. No. 13/229,712 filed 10 Sep. 2011, now U.S. Pat. No. 9,064,434. The entire disclosures of these prior applications are incorporated herein by this reference in their entireties.

BACKGROUND

This disclosure relates generally to a system for holding objects and, in an example described below, more particularly provides for releasably retaining objects relative to an airplane cabin window frame.

A holder apparatus can be used to secure an object, so that the object is protected from damage, is readily accessible, is appropriately positioned, is prevented from displacing in one or more directions, etc. Therefore, it will be readily appreciated that improvements in the arts of constructing and utilizing holder apparatuses are continually needed, whether or not such improvements facilitate one or more of the functions of providing ready accessibility, appropriate positioning, displacement prevention, or any other function.

DETAILED DESCRIPTION

Figure 1:
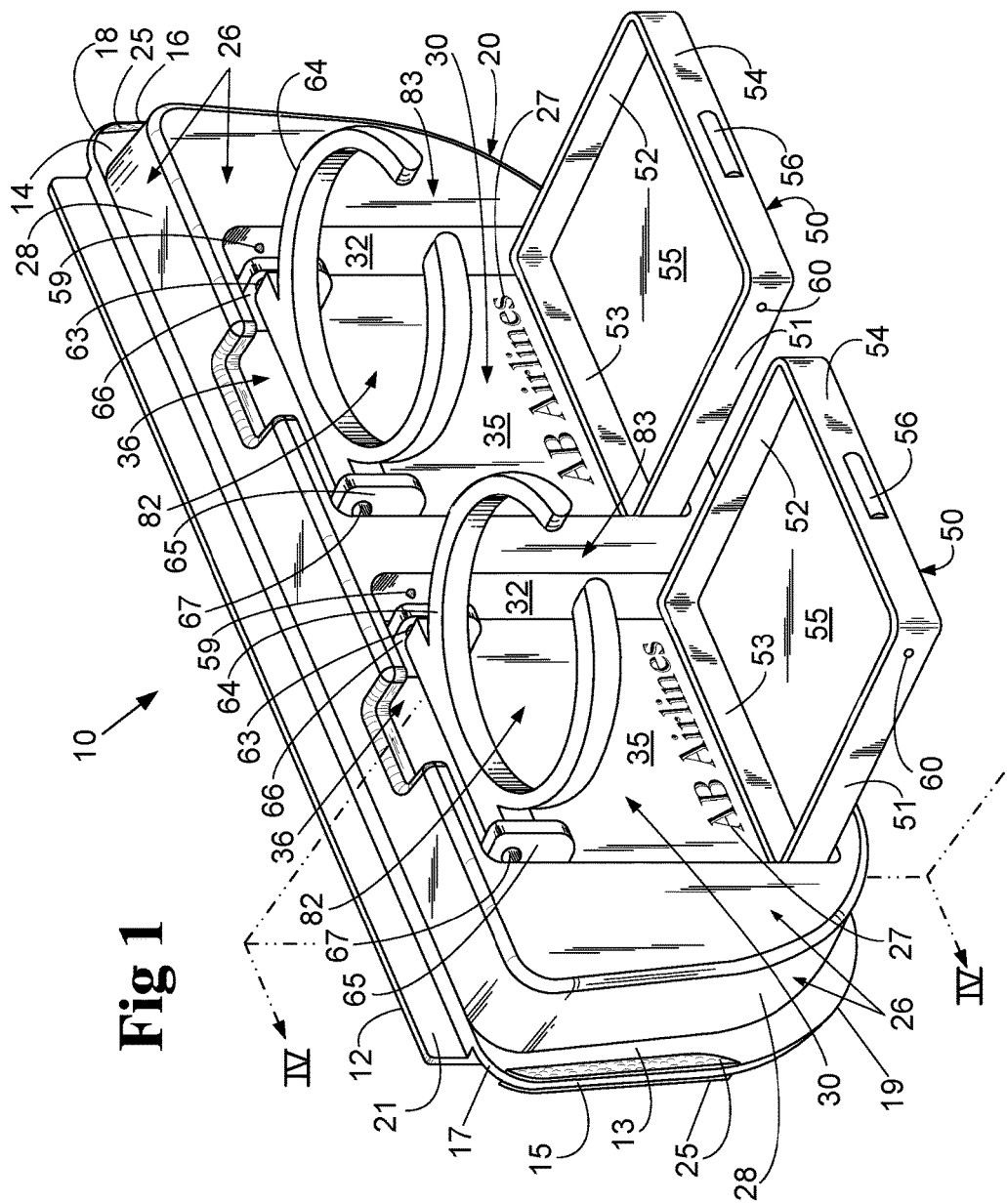
FIG. 1 is a representative perspective view of an example of a holder apparatus which can embody principles of this disclosure, the apparatus being depicted in a deployed configuration.

With reference to the figures, certain reference numbers are used to indicate corresponding like elements throughout the several views of the drawings. Although specific configurations, materials, combinations of elements and uses are illustrated and described, it should be understood that a number of variations to the elements and to the configurations of those elements described herein and depicted in the accompanying drawings can be made within the scope of this disclosure.

The present disclosure provides to the art a holder apparatus and associated system that can be used for holding beverage containers or other objects. The apparatus can be permanently or temporarily mounted to a preexisting airplane cabin window frame. In certain examples described herein, the apparatus is designed primarily for the convenience and use of a passenger sitting next to a window on either a left or right side of an airplane cabin.

Representatively illustrated in FIGS. 1-8 is an example of a holder apparatus 10 and associated method, which apparatus and method can embody principles of this disclosure. However, it should be clearly understood that the apparatus 10 and method are merely one example of an application of the principles of this disclosure in practice, and a wide variety of other examples are possible. Therefore, the scope of this disclosure is not limited at all to the details of the apparatus 10 and method described herein and/or depicted in the drawings.

Figure 3:
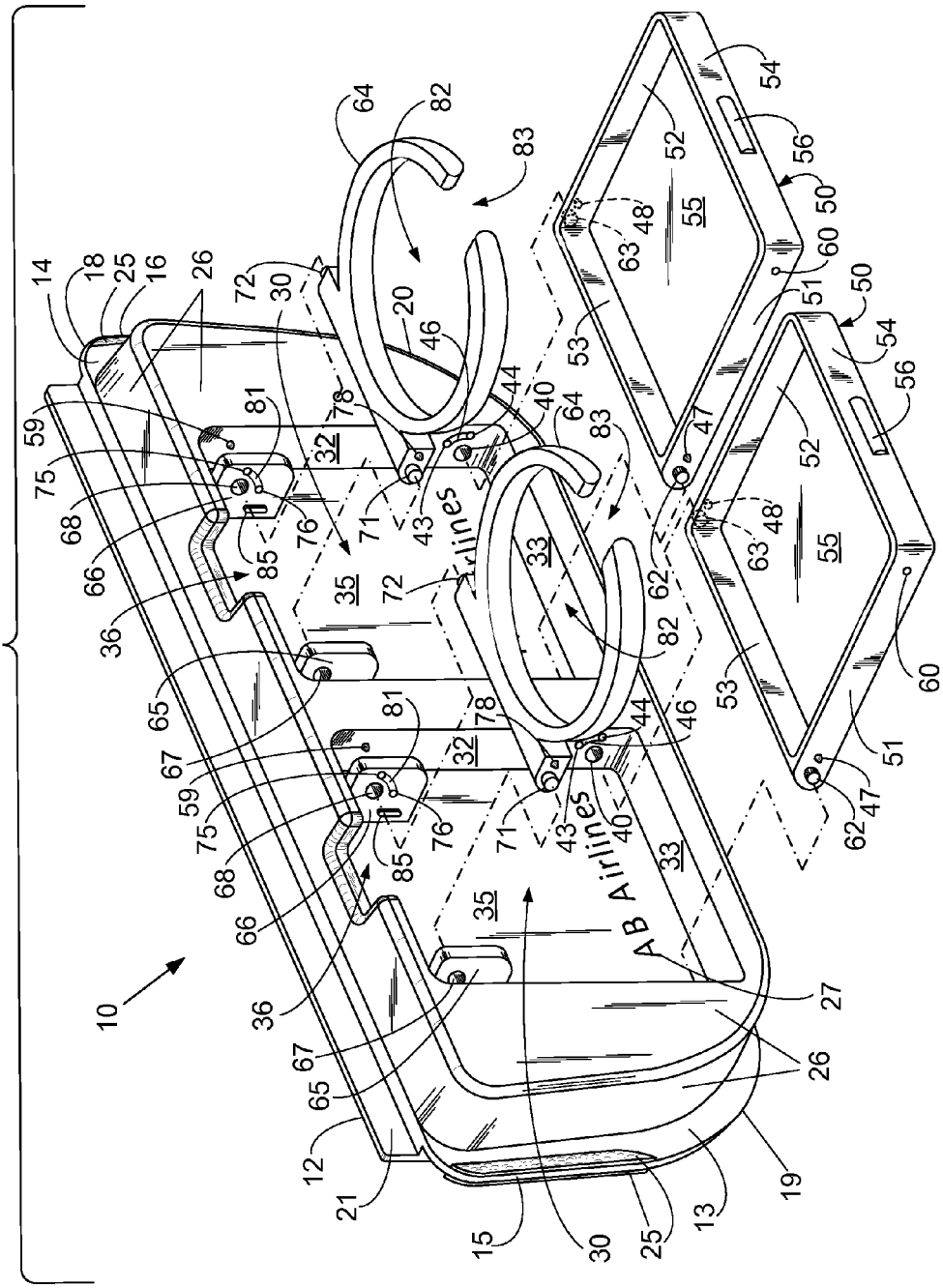
FIG. 3 is a representative perspective exploded view of the holder apparatus in a deployed configuration.

Referring specifically to FIGS. 1 and 3, the holder apparatus 10 is representatively illustrated in a deployed configuration for use by an airplane passenger. FIG. 3 provides an exploded view of the apparatus 10 as depicted in FIG. 1.

In this example, the apparatus 10 includes receptacle trays 50 and stabilizer arms 64 that are foldable relative to a mounting structure 12. Although FIGS. 1 and 3 depict two sets of receptacle trays 50 and stabilizer arms 64 in deployed positions, each receptacle tray and stabilizer arm set are independent, such that a user may deploy one or both receptacle tray/stabilizer arm sets.

Figure 2:
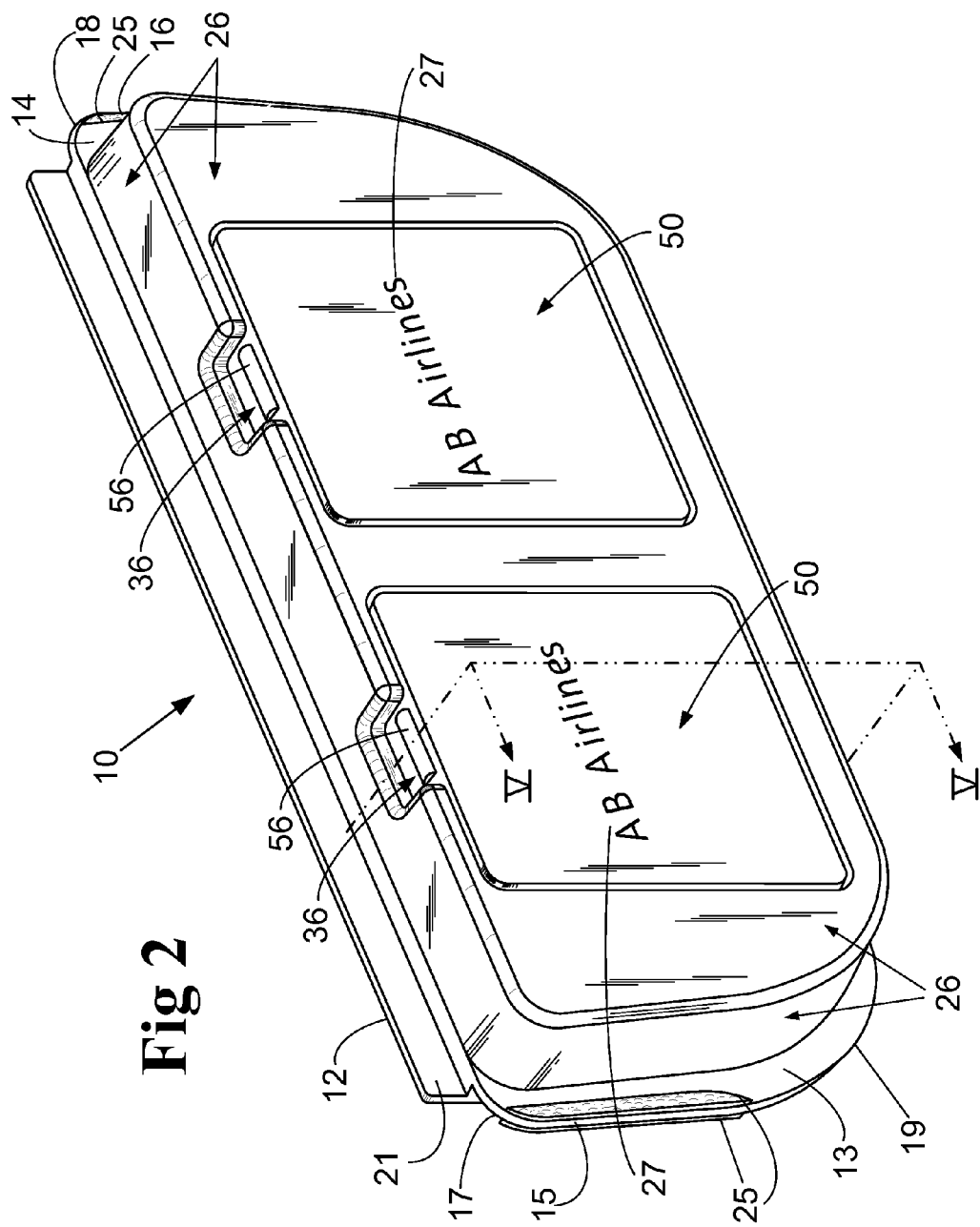
FIG. 2 is a representative perspective view of the holder apparatus in a non-deployed configuration.

Referring additionally now to FIG. 2, both holder apparatus receptacle trays 50 and stabilizer arms 64 are depicted in non-deployed positions. However, as discussed above, one or both of the receptacle trays 50 and stabilizer arms 64 may be deployed or not deployed. Any number of receptacle trays 50 and any number of stabilizer arms 64 may be provided in the apparatus 10. Thus, the scope of this disclosure is not limited to any particular number, configuration, arrangement or combination of receptacle trays or stabilizer arms.

The holder apparatus 10 example depicted in FIGS. 1-8 includes a mounting structure 12, two fold-down receptacle trays 50, and two stabilizer arms 64. Each receptacle tray 50 is comprised of a bottom 55, a front side 54, a rear side 53, and opposing left and right sides 51, 52.

The sides 51, 52, 53, 54 and bottom 55 in this example can retain a liquid therein, in the event that the liquid spills from a beverage container supported on the tray 50. However, it is not necessary for the tray 50 to be capable of retaining spilled liquids in keeping with the scope of this disclosure.

Figure 4:
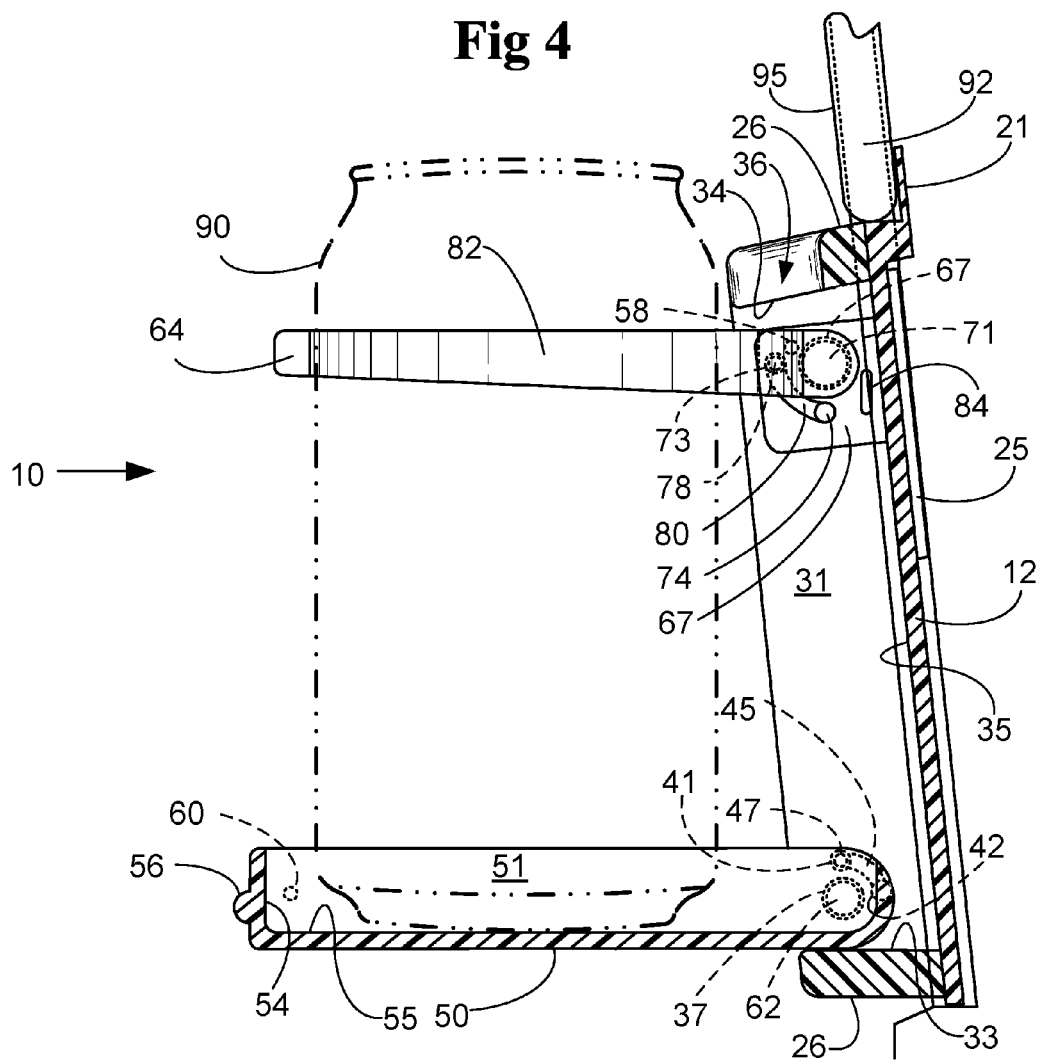
FIG. 4 is a representative cross-sectional view of the holder apparatus in the deployed configuration, taken along line IV-IV of FIG. 1.

In this example, each receptacle tray 50 is sized to hold an object, such as a beverage container 90 (see FIG. 4). The beverage container 90 may be a drinking vessel, or any type of beverage container that holds liquid (such as, cups with or without handles, cans, bottles, glasses), or any other type of container that holds liquid.

In other examples, the object held by the apparatus 10 may be a container for solid or granular material, a case (for pens or reading glasses, for example), portable hand-held devices (e.g., music players, computing devices, communication devices such as mobile telephones, cameras or video devices, writing instruments, etc.) or any other type of object. The scope of this disclosure is not limited to any particular type or number of object(s) held by the apparatus 10.

The mounting structure 12 is depicted in the drawings as comprising a single planar member. However, in other examples, the mounting structure 12 could comprise multiple members and could be formed with one or more curves or other shapes, profiles, etc. The scope of this disclosure is not limited to any particular construction or configuration of the mounting structure 12.

Figure 8:
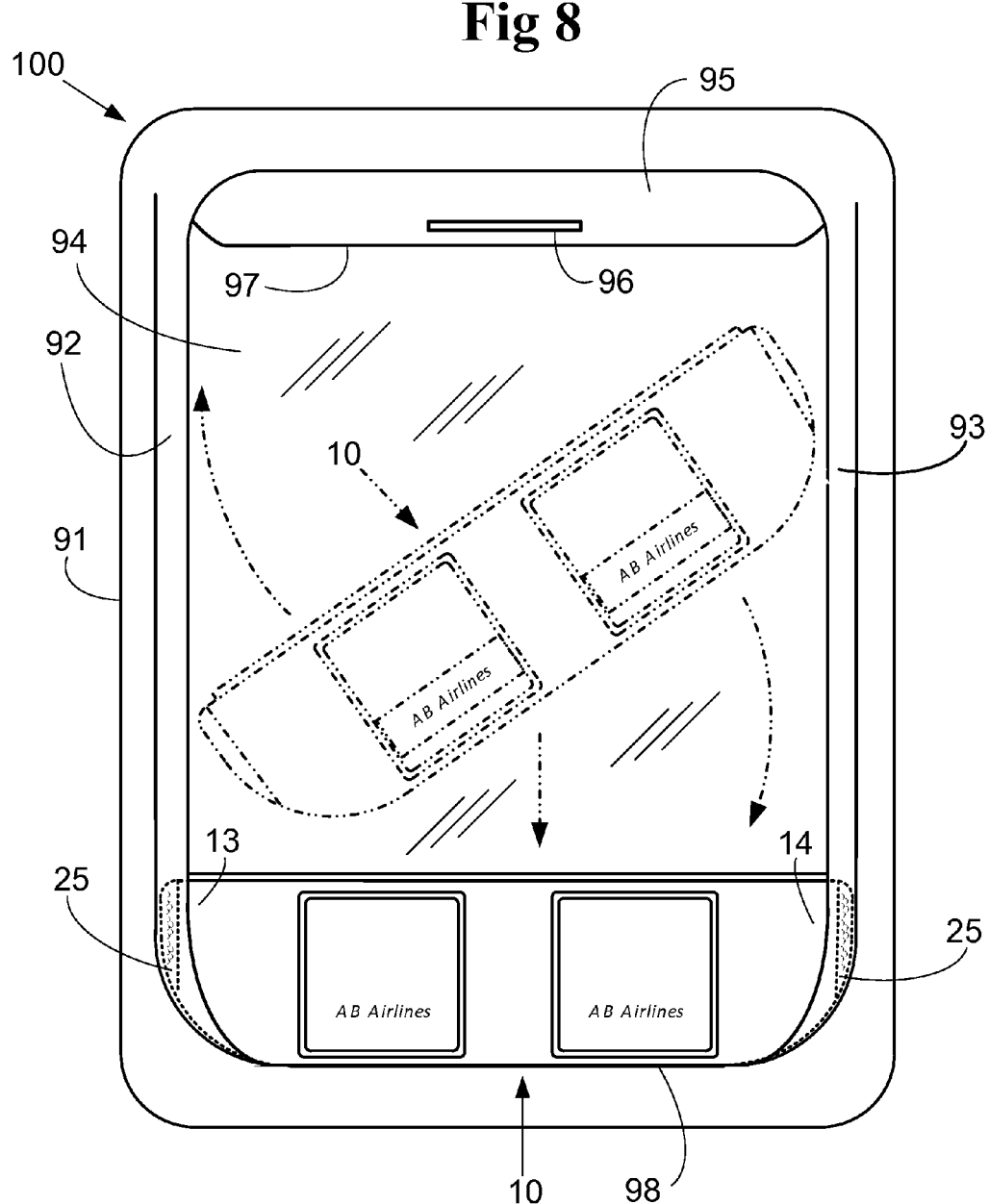
FIG. 8 is a representative front view of the holder apparatus as installed with an airplane cabin window frame assembly, with a pre-installed position depicted in dashed lines.

In the example of FIGS. 1-8, the mounting structure 12 is configured to engage an airplane cabin window frame 91 (see FIG. 8). For this purpose, the mounting structure 12 includes outwardly extending and generally vertically oriented left and right side extensions 13, 14. The left and right side extensions 13, 14 in this example are appropriately dimensioned to engage and fit within generally vertically extending left and right side grooves or channels 92, 93 of the window frame 91.

Note that the window frame channels 92, 93 are the same channels as are used in the window frame 91 to provide for sliding adjustment of a window shade 95 relative to a window 94 in the window frame 91. The window shade 95 is received in the channels 92, 93 and slides therein (for example, by a passenger grasping and displacing a handle 96 of the window shade 95).

When the apparatus 10 is installed, left and right end edges 15, 16 of the mounting structure 12 are received in the respective channels 92, 93. Such engagement between the left and right extensions 13, 14 and the window frame 91 fixes an orientation of the apparatus 10 relative to the window frame, so that the apparatus is prevented from rotating substantially forward or rearward relative to the window frame (although manufacturing tolerances may allow for some limited movement). In addition, the mounting structure 12 may in some examples rest on a bottom of the window frame 91, thereby stabilizing the apparatus 10 against rotation to the right or left relative to the window frame, and preventing the apparatus from displacing further downward relative to the window frame.

Left and right top corners 17, 18, and left and right bottom corners 19, 20, of the respective mounting structure extensions 13, 14 can be rounded or otherwise appropriately shaped to cooperatively engage or conform to the window frame 91 and channels 92, 93 therein. It is not necessary for the corners 17, 18, 19, 20 to be complementarily shaped relative to the window frame 91 and channels 92, 93, but in this example the corners do provide for convenient installation of the apparatus 10, and for secure engagement of the apparatus with the window frame so that, in use, significant movement of the apparatus relative to the window frame is prevented. The mounting structure may have a shoulder 28 following the curvature of lower corners 19, 20.

Referring again to FIG. 4, a flange 21 may be formed or otherwise attached to an upper portion of the mounting structure 12. This flange 21 may extend along the upper portion of the mounting structure 12 from a left side that is proximate the window shade channel 92 to a right side that is proximate the window shade channel 93. However, even though it is preferred that the flange 21 be continuous from the left side to the right side along the mounting structure, it is not necessary for the flange 21 to be continuous. The flange 21 may include multiple tabs that extend from the upper portion of the mounting structure 12 at various locations along the mounting structure 12.

The flange 21 is also offset from the mounting structure 12 toward the airplane cabin window 94 so that when the window shade 95 is displaced downward toward the bottom of the window frame 91, the shade 95 will engage the upper portion of the mounting structure 12 and overlap at least a portion of the flange 21. FIG. 4 shows the flange 21 extending upward from the mounting structure 12 into a space between the window shade 95 and the window 94. This overlap of the flange 21 with the window shade 95 can provide additional strength and stability to the holder apparatus 10 to hold heavier objects (such as larger beverage containers, larger phones, food containers, etc.). Therefore, when the window shade 95 is displaced downward into engagement with the mounting structure 12, the flange 21 can further provide stability to prevent movement of the holder apparatus 10 within the window frame 91.

A material 25 can be provided on or in the left and right extensions 13, 14 to perform a variety of functions. For example, the material 25 can mitigate rattling, reduce or eliminate any clearance between the extensions and the channels 92, 93, provide for friction between the extensions and the channels (e.g., to prevent inadvertent upward displacement of the apparatus 10 relative to the window frame 91), etc.

The material 25 can comprise any suitable material or substance (such as, felt, resilient elastomer, hook and loop-type material, pile material, etc.). The material 25 may be attached to, or incorporated onto, the extensions 13, 14 using any technique (such as, adhesive bonding, integral forming, snap fitting, etc.). However, use of the material 25 is not necessary in keeping with the scope of this disclosure.

The trays 50 and stabilizer arms 64 are pivotably mounted to a housing 26 that is attached to the mounting structure 12 (for example, by adhesive bonding, snap fitting, ultrasonic welding, etc.). In other examples, the housing 26 could instead be integrally formed with the mounting structure 12, or the trays 50 and stabilizer arms 64 could be otherwise pivotably mounted relative to the mounting structure (e.g., without use of the housing).

Figure 5:
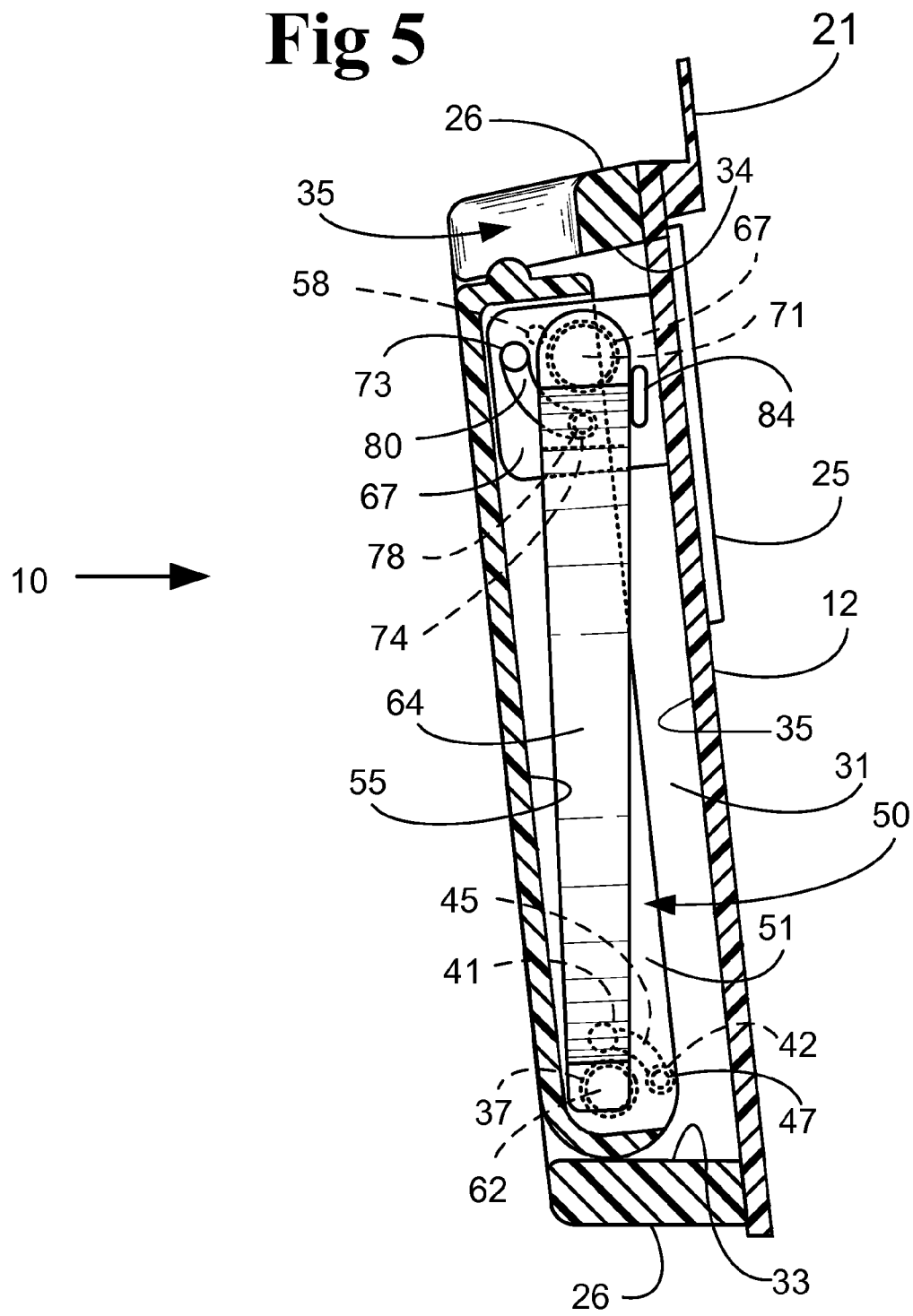
FIG. 5 is a representative cross-sectional view of the holder apparatus in the non-deployed configuration, taken along line V-V of FIG. 2.

In the FIGS. 2 and 5 non-deployed configuration, the trays 50 and stabilizer arms 64 are received in cavities 30 recessed into a front side of the housing 26. In this example, each cavity 30 is bounded by left and right sides 31, 32 and top and bottom sides 34, 33. A rear wall 35 may also be provided in the housing 26, or the mounting structure 12 could serve as the rear wall in other examples.

Pivot pins 62, 63 can be formed on the left and right sides 51, 52 of the trays 50 for engagement with openings 37, 40 formed in the left and right sides 31, 32 of the cavities 30. For pivoting each tray 50 from its non-deployed to its deployed position, a pull tab 56 on the front side 54 of the tray can be accessed via a notch or recess 36 formed in the housing 26.

Locking protrusions 47, 48 on the respective left and right sides 51, 52 of each tray 50 (see FIG. 6) are received in respective left and right arcuate slide tracks 45, 46 formed in the left and right sides 31, 32 of the cavities 30. Each left slide track 45 includes dimples 41, 42 at its respective opposite ends, and each right side slide track 46 includes dimples 43, 44 at its respective opposite ends.

When a tray 50 is in its upper non-deployed position (see FIGS. 2 and 5), the protrusions 47, 48 engage the dimples 41, 43 to releasably maintain the tray in this position. When the tray 50 is in its lower deployed position (see FIGS. 1, 3 and 4), the protrusions 47, 48 engage the dimples 42, 44 to releasably maintain the tray in the deployed position. Between the deployed and non-deployed positions of the tray 50, the protrusions 47, 48 slide along the respective tracks 45, 46.

Figure 6:
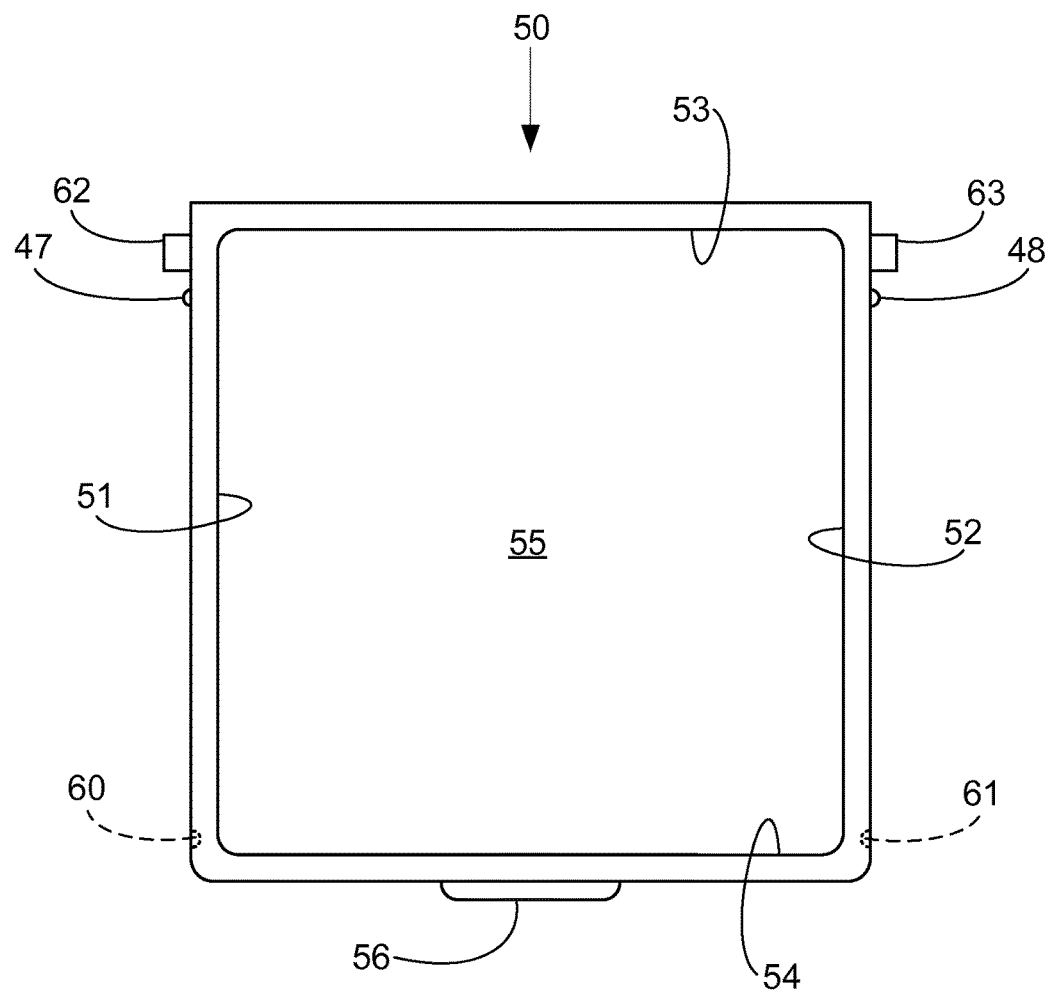
FIG. 6 is a representative top view of an example of a tray of the holder apparatus.
Figure 7:
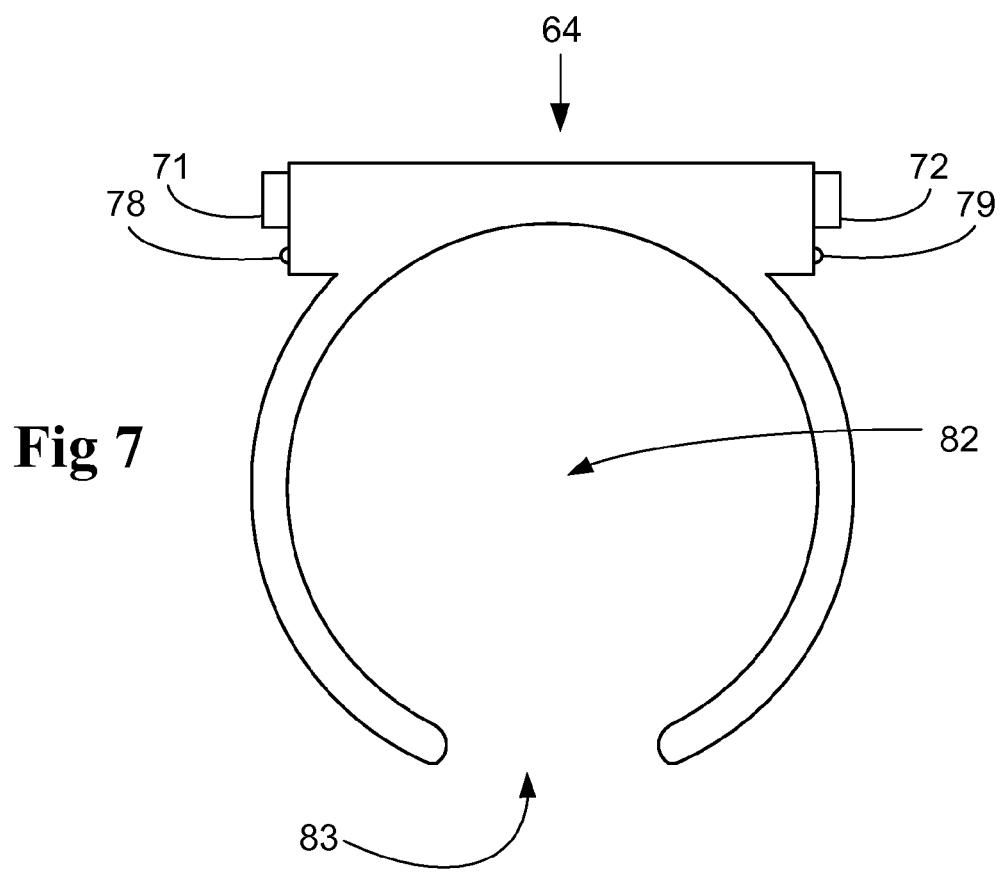
FIG. 7 is a representative top view of an example of a stabilizer of the holder apparatus.

In addition, each tray 50 is provided with dimples 60, 61 on the respective left and right sides 51, 52 (see FIG. 6). The dimples 60, 61 are engaged by respective protrusions 58, 59 formed on the respective left and right sides 31, 32 of the cavity 30 when the tray 50 is in the non-deployed position.

Each stabilizer arm 64 is pivotably mounted to the housing 26 by means of left and right hubs 65, 66 extending forwardly from the rear wall 35 of the cavity 30. The tray 50 is dimensioned so that the associated stabilizer arm 64 and hubs 65, 66 fit within the sides 51, 52, 53, 54 of the tray in the non-deployed configuration. In this manner, the apparatus 10 is compact for convenient transport by the passenger.

Each stabilizer arm 64 has left and right pivot pins 71, 72 formed thereon (see FIG. 7) for rotational engagement with respective left and right openings 67, 68 formed in the hubs 65, 66. Left and right shoulders or stops 84, 85 are formed on the respective left and right hubs 65, 66 to prevent rotation of the stabilizer arm 64 past its non-deployed position.

Protrusions 78, 79 formed on respective left and right sides of each stabilizer arm 64 (see FIG. 7) engage left and right arcuate slide tracks 80, 81 formed in the left and right hubs 65, 66. Dimples 73, 74 are formed at respective opposite ends of each left slide track 80, and dimples 75, 76 are formed at respective opposite ends of each right slight track 81.

When a stabilizer arm 64 is in its lower non-deployed position (see FIGS. 2 and 5), the protrusions 78, 79 engage the dimples 74, 76 to releasably maintain the stabilizer in this position. When the stabilizer arm 64 is in its upper deployed position (see FIGS. 1 and 4), the protrusions 78, 79 engage the dimples 73, 75 to releasably maintain the stabilizer arm in the deployed position. Between the deployed and non-deployed positions of the stabilizer arm 64, the protrusions 78, 79 slide along the respective tracks 80, 81.

Each stabilizer arm 64 has a substantially circular opening 82 therein for receiving a container (such as the beverage container 90) or other object in the deployed position. In other examples, the opening 82 could be otherwise shaped to conform to a particular object shape. Where multiple stabilizer arms 64 are provided in the apparatus 10, the openings 82 of the stabilizer arms may be shaped the same, or they may be differently shaped.

In the FIGS. 1-8 example, the opening 82 is shaped to appropriately accommodate containers (such as glasses, cans, bottles, cups, etc.) of the types commonly used for beverage service on commercial airplanes. To provide for cup handles, a gap 83 can be formed in each stabilizer arm 64. However, the gap is not required.

For advertisement, promotional or instructional purposes, textual and/or graphical material 27 can be printed, embossed and/or molded into the trays 50 and/or rear walls 35 of the cavities 30. Of course, such material 27 can take any form and can be placed anywhere on or in the apparatus 10, as desired.

In a system 100 for holding an object (such as the beverage container 90 or other object) relative to an airplane cabin window 94, the apparatus 10 is rotated as depicted in FIG. 8 in dashed lines, positioned adjacent the window 94, and then rotated in an opposite direction (toward a horizontal orientation) to engage the left and right extensions 13, 14 in the respective channels 92, 93. The window shade 95 should be in a raised position during this process, or at least raised sufficiently far that it does not interfere with the apparatus 10 installation.

With the extensions 13, 14 engaged in the channels 92, 93, the apparatus 10 is displaced downward, until it engages a lower side 98 of the window frame 91, or the extensions engage lower ends of the channels. The window shade 95 can then be lowered, if desired, until a lower edge 97 of the window shade contacts the apparatus 10. Such contact can help to prevent inadvertent dislodgement of the apparatus 10 from the window frame 91.

Note that, although FIG. 8 depicts the apparatus 10 being rotated counter-clockwise first, and then rotated clockwise to engage the extensions 13, 14 in the channels 92, 93, these directions can be reversed if desired.

When installed, the mounting structure 12 may be oriented vertical or nearly vertical (see FIGS. 4 and 5). Typically, airplane cabin walls are curved, and so the channels 92, 93 of the window frame 91 are not necessarily vertical.

To compensate for channels 92, 93 that are inclined relative to vertical, the mounting structure 12, housing 26, trays 50, stabilizing arms 64 and/or other elements of the apparatus 10 can be appropriately configured, so that the trays and stabilizer arms 64 are substantially horizontal in the deployed configuration. As used herein, "substantially horizontal" refers to an orientation of the holder apparatus 10 with respect to (or in relation to) the orientation of the window frame 91. The holder apparatus is substantially horizontal in the window frame when the tray 50 is generally perpendicular to portions of the channels 92, 93 that are parallel to each other. However, the trays 50 and stabilizer arms 64 may not be oriented horizontal in the deployed configuration, in keeping with the principles of this disclosure.

Use of multiple trays 50 and stabilizer arms 64 in the apparatus 10 can provide for situations where the cabin window 94 is more forwardly or rearwardly positioned relative to the passenger, or where a reclined seat in front of the passenger blocks access to one of the trays. The passenger can choose to deploy one set of the trays 50 and stabilizer arms 64 that is most advantageously positioned for use, or the passenger can use both sets of the trays and stabilizer arms if they are appropriately located relative to the passenger and any obstructions.

The apparatus 10 can be made from relatively sturdy but lightweight materials, such as transparent, translucent, or opaque materials including, but not limited to, lightweight metal (such as aluminum, aluminum alloys, titanium, titanium alloys, beryllium alloys, etc.), cardboard, or plastic materials (e.g., any class of thermoplastic or thermosetting plastics, including acrylics, polyesters, silicones, polyurethanes, polypropylene, polyethyleneterephthalate, rigid polystyrene, polycarbonate, polyvinylchloride, vinyl, nylon, etc.), suitable to support the weight of one or more filled beverage containers, or other objects such as small handheld items and the like. Such aforementioned plastic may be comprised of flame retardant, self-extinguishing, toxic, and/or non-toxic material, or any combination thereof, to provide passenger safety as required.

The apparatus 10 can be made by using an injection molding process or other similar types of processes using aforementioned various plastic materials for high volume and low cost production. The apparatus 10 may be formed using a suitable heat resistant plastic material or composition. A material with a high strength-to-weight ratio may be used so that the apparatus 10 is lightweight, easy to install and readily carried.

Throughout this document, the terms "beverage container" and "objects" are used in a broad sense. The term "beverage container" can include drinking vessels, such as cups with or without handles, beverage cans, beverage bottles, or any other type of container which holds liquid. The container can be comprised of plastic, glass, aluminum or any other type of material that can hold liquid. The term "objects" can include items such as food items, transportation tickets, writing instruments, small pocket books, or portable hand-held devices such as music players, computing devices, communication devices such as mobile telephones, cameras or video devices, or the like.

It may now be fully appreciated that the above disclosure provides to the art an apparatus for holding one or more beverage containers and/or other objects. In an example described above, the apparatus 10 comprises only a few elements that can be economically manufactured and assembled, and the completed apparatus is easy to install and use, and convenient, lightweight and compact for transport.

This disclosure describes a novel and relatively easy to use holder apparatus 10 example for use with an airplane cabin window frame 91. The apparatus 10 provides a benefit and safe convenience for a passenger that is utilizing a seat adjacent to an airplane cabin window.

The holder apparatus 10 can conveniently mount to the preexisting airplane cabin window frame 91, without physical modification to the frame, by utilizing preexisting window shade slide channels 92, 93. Such channels are currently integrated into left and right vertical walls of a typical airplane window frame and are generally provided to hold, support, and guide left and right edges of the window shade 96 during up and down slide motion. The holder apparatus 10 can be received in the slide channels 92, 93 below the leading edge 97 of the preexisting window shade 95.

The holder apparatus 10 examples described above comprise one or more fold-down trays 50 and a window frame mounting structure 12, together forming a single assembly. Each fold-down support tray 50 can be large enough to accommodate a wide variety of large objects and/or beverage container sizes and shapes, including cups with a handle. In addition, a pivoting stabilizer arm 64 can permit cups of various sizes which are presently provided by airlines, including cups with a handle, to be securely held by the apparatus 10, in the event an airplane should encounter turbulence or any sort of uneven flight. The stabilizer arm 64 can be rotated upward and out from a substantially vertical non-deployed position in the apparatus 10 to a horizontal or near horizontal deployed position.

The holder apparatus 10 examples described herein optionally include a material 25 located proximate the left and right edges 15, 16 of the window frame mounting structure 12. The material 25, in combination with the window frame slide channels 92, 93, can enable the holder apparatus 10 to be substantially vertically positioned within the window frame 91, and can in some examples maintain the holder apparatus in any desired position relative to the channels.

In one example, a fold-down tray 50 and stabilizer arm 64 may be positioned on a left side of the holder apparatus 10. One use for this example is for a passenger sitting on a left side of an airplane cabin, such that a cabin window 94 is in closer proximity to a seat located in front of the passenger. Another use for this example is for a passenger sitting on a right side of the airplane cabin, such that the cabin window 94 is in a closer proximity to, and to the immediate right of, the passenger and additional space above the passenger's arm rest is desired.

In another example, a fold-down tray 50 and stabilizer arm 64 can be positioned on a right side of the holder apparatus 10. One use for this example is for a passenger sitting on the right side of the airplane cabin, such that a cabin window 94 is in closer proximity to the seat located in front of the passenger. Another use for this example is for a passenger sitting on the left side of the airplane cabin, such that the cabin window 94 is in a closer proximity to, and to the immediate left of, the passenger and additional space above the passenger's arm rest is desired.

The holder apparatus 10 examples described herein can be used with an installation method that requires no modification to the airplane cabin or cabin window frame 91. The holder apparatus 10 can be readily installed by a passenger, or airline personnel could install holder apparatuses for the convenience of its passengers.

A holder apparatus 10 for holding an object (such as the beverage container 90 or other object) relative to an airplane cabin window frame 91 is provided to the art by the above disclosure. In one example, the holder apparatus 10 can comprise a mounting structure 12 that locates in opposing window shade channels 92, 93 of the window frame 91, and at least one tray 50 pivotably mounted relative to the mounting structure 12.

The holder apparatus 10 can include at least one tray 50 pivotably mounted relative to the mounting structure 12. The stabilizer arm 64 may be received in the tray 50 in a non-deployed position of the tray.

The stabilizer arm 64 can include an opening 82 that receives the object therein when the stabilizer arm is in a deployed position.

The holder apparatus 10 can also include at least one cavity 30. The stabilizer arm 64 may be received in the cavity 30 in a non-deployed position of the stabilizer arm.

The holder apparatus 10 can have deployed and non-deployed configurations. The stabilizer arm 64 may pivot upward from the non-deployed to the deployed configuration, and the tray 50 may pivot downward from the non-deployed to the deployed configuration.

The holder apparatus 10 can include a housing 26, and the stabilizer arm 64 and the tray 50 may be pivotably mounted to the housing. The housing 26 and the mounting structure 12 may be separately formed, or they may be a single integrally formed element.

In a non-deployed configuration of the holder apparatus 10, the stabilizer arm 64 and the tray 50 may be received in a cavity 30 formed in the housing 26.

The tray 50 can comprise a bottom 55 and one or more sides 51, 52, 53, 54 that form a liquid receptacle. This liquid receptacle may retain any liquid that spills from a beverage container held by the apparatus 10.

The window shade channels 92, 93 can have a window shade 95 slidably received therein. The window shade 95 may be adjusted vertically by sliding displacement relative to the channels 92, 93.

The holder apparatus 10 can also include first and second ends 13, 14 which extend from the mounting structure 12, wherein the first end 13 extends from a left side of the structure 12 and the second end 14 extends from a right side of the structure 12; and a first material 25 is secured to the first end 13 and a second material 25 is secured to the second end 14, wherein the first and second materials 25 engage respective ones of the opposing window shade channels 92, 93, thereby releasably securing the apparatus 10 to the window frame 91.

The holder apparatus 10 may also include at least one surface (trays 50, cavities 30, rear walls 35, etc.) of the apparatus to visually display promotional material 27.

A system 100 for holding an object (such as the beverage receptacle 90 or other object) relative to an airplane cabin window 94 is also provided to the art by the above disclosure. In one example, the system 100 comprises a holder apparatus 10 including a mounting structure 12 that engages a window frame 91. The holder apparatus 10 also includes at least one tray 50 pivotably mounted relative to the mounting structure 12.

The mounting structure 12 engages both of two opposing window shade channels 92, 93 of the window frame 91 in response to rotational displacement of the mounting structure 12 relative to the window frame. A window shade 95 is slidably engaged with the window shade channels 92, 93 of the window frame 91.

A method for installing a holder apparatus 10 in a window frame 91 of an airplane cabin window 94 that can include placing a mounting structure 12 of the apparatus 10 between the two opposing window shade channels 92, 93 of the window frame 91 of the airplane cabin window 94, rotating the apparatus 10 relative to the window 94, engaging first and second ends 13, 14 of the apparatus 10 with a respective one of the two opposing window shade channels 92, 93 of the window frame 91, and displacing the apparatus 10 toward a bottom of the window frame 91, thereby securing the apparatus 10 in the window frame 91 proximate the bottom of the window frame 91. However, it should be understood that the apparatus 10 can be secured in any position in the window frame 91 by sliding the apparatus 10 either up or down after the apparatus 10 has been rotated into engagement with the channels 92, 93.

The method can also include engaging a material 25, which is secured to each of the first and second ends 13, 14, with the opposing window shade channels 92, 93, thereby increasing friction between the first and second ends 13, 14 and the material 25 resisting removal of the apparatus 10 from the window frame 91 in response to the increased friction.

The apparatus used in the method can also include a tray 50 pivotably mounted to a mounting structure 12 of the apparatus 10, where the tray 50 provides support for holding a container 90 or other object relative to the window 94. Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A holder system for holding an object relative to an airplane cabin window, the system comprising:
    a mounting structure for insertable engagement with an airplane cabin window frame disposed frontward relative to an airplane cabin window in a front-back direction, the window frame having a left window frame channel and a right window frame channel;
    the mounting structure comprising a left side extension having a lower rounded corner, and a right side extension having a lower rounded corner, the mounting structure comprising a left-right distance measured between a left extent of the left side extension and a right extent of the right side extension that is sufficient to allow location of the left side extension within the left window frame channel while the right side extension is located within the right window frame channel, wherein the mounting structure is sized relative to the window frame such that each of (1) the left side extension can be introduced into the left window frame channel and (2) the right side extension can be introduced into the right window frame channel in response to rotation of the mounting structure relative to the window frame without translating the mounting structure in an up-down direction and without translating the mounting structure in the front-back direction;
    the mounting structure further comprising a shoulder portion that follows the curvature of the lower rounded corners of the left and right side extensions; and
    at least one tray pivotably mounted relative to the mounting structure;
    wherein the mounting structure is movable in the up-down direction while the left side extension is within the left window frame channel and the right side extension is within the right window frame channel.

2. The holder system of claim 1, further comprising at least one stabilizer arm pivotably mounted relative to the mounting structure.

3. The holder system of claim 2, wherein the stabilizer arm includes an opening configured to receive the object therein when the stabilizer arm is in a non-deployed position.

4. The holder system of claim 2, further comprising at least one cavity, and wherein the stabilizer arm is received in the at least one cavity in a non-deployed position of the stabilizer arm.

5. The holder system of claim 2, wherein the stabilizer arm is received in the tray in the non-deployed position of the tray.

6. The holder system of claim 2, wherein the holder apparatus has deployed and non-deployed configurations, wherein the stabilizer arm pivots upward from the non-deployed to the deployed configuration, and wherein the tray pivots downward from the non-deployed to the deployed configuration.

7. The holder system of claim 2, further comprising a housing, and wherein the stabilizer arm and the tray are pivotably mounted to the housing.

8. The holder system of claim 7, wherein, in a non-deployed configuration of the holder apparatus, the stabilizer arm and the tray are received in a cavity formed in the housing.

9. The holder system of claim 1, wherein the tray comprises a bottom and one or more sides that form a receptacle capable of retaining a liquid.

10. The holder system of claim 1, wherein the mounting structure includes a flange that extends from the mounting structure, wherein the extension of the flange is configured to be parallel to a plane shared by the left window frame channel and the right window frame channel when the mounting structure is disposed within the left window frame channel and the right window frame channel, wherein the flange extension is disposed further rearward in the front-rear direction as compared to the plane, wherein the flange is configured to receive a window shade that is slidably received in the left window frame channel and the right window frame channel, and wherein the window shade can selectively remain in contact with the flange while the mounting structure is moved in the up-down direction while keeping the mounting structure disposed within the left window frame channel and the right window frame channel.

11. The holder system of claim 1, further comprising:
a material carried by at least one of the left side extension and the right side extension, the material being located such that the material can be located between the mounting structure and the window frame when at least one of the left side extension and the right side extension are disposed within the left window frame channel and the right window frame channel, respectively.

12. The holder system of claim 1, wherein at least one surface of the apparatus visually displays promotional material.

13. A system for holding an object relative to an aircraft window, the system comprising:
a holder apparatus for engagement with an airplane cabin window frame disposed frontward relative to an aircraft cabin window in a front-back direction, the window frame having a left window frame channel and a right window frame channel; and
the holder apparatus comprising a mounting structure that is configured to engage the window frame, the holder apparatus further comprising at least one tray pivotably mounted relative to the mounting structure;
wherein the mounting structure has a curvature at the lower left and lower right corners and a shoulder portion following the curvature;
and wherein the mounting structure is configured to selectively engage both the left window frame channel and the right window frame channel in response to rotation of the mounting structure relative to the window frame without translating the mounting structure in an up-down direction and without translating the mounting structure in the front-back direction; and
wherein after the mounting structure is selectively engaged with both the left window frame channel and the right window frame channel, the mounting structure is movable in the up-down direction while maintaining engagement between the mounting structure and both the left window frame channel and the right window frame channel.

14. The system of claim 13, wherein the holder apparatus further includes at least one stabilizer arm pivotably mounted relative to the mounting structure.

15. The system of claim 14, wherein the stabilizer arm includes an opening configured to receive the object therein when the stabilizer arm is in a deployed position.

16. The system of claim 14, wherein the holder apparatus further includes at least one cavity, and wherein the stabilizer arm is received in the at least one cavity in a non-deployed position of the stabilizer arm.

17. The system of claim 14, wherein the stabilizer arm is received in the tray in a non-deployed position of the tray.

18. The system of claim 14, wherein the holder apparatus has deployed and non-deployed configurations, wherein the stabilizer arm pivots upward from the non-deployed to the deployed configuration, and wherein the tray pivots downward from the non-deployed to the deployed configuration.

19. The system of claim 14, wherein the holder apparatus further includes a housing, and wherein the stabilizer arm and the tray are pivotably mounted to the housing.

20. The system of claim 19, wherein, in a non-deployed configuration of the holder apparatus, the stabilizer arm and the tray are received in a cavity formed in the housing.

21. The system of claim 13, wherein the tray comprises a bottom and one or more sides that form a receptacle capable of retaining a liquid.

22. The system of claim 13, further comprising:
a material carried by at least one of a left side extension of the mounting structure and a right side extension of the mounting structure, the material being located such that the material can be located between the mounting structure and the window frame when at least one of the left side extension and the right side extension are disposed within the left window frame channel and the right window frame channel, respectively.

23. The system of claim 13, wherein at least one surface of the apparatus visually displays promotional material.

* * * * *